United States Patent
Zhang

(10) Patent No.: US 11,099,207 B2
(45) Date of Patent: Aug. 24, 2021

(54) LOW-NOISE MULTI-AXIS ACCELEROMETERS AND RELATED METHODS

(71) Applicant: Analog Devices, Inc., Norwood, MA (US)

(72) Inventor: Xin Zhang, Acton, MA (US)

(73) Assignee: Analog Devices, Inc., Wilmington, MA (US)

( * ) Notice: Subject to any disclaimer, the term of this patent is extended or adjusted under 35 U.S.C. 154(b) by 247 days.

(21) Appl. No.: 16/171,302

(22) Filed: Oct. 25, 2018

(65) Prior Publication Data

US 2020/0132716 A1  Apr. 30, 2020

(51) Int. Cl.
   *G01P 15/18*  (2013.01)
   *G01P 15/125*  (2006.01)
   *G01P 15/08*  (2006.01)

(52) U.S. Cl.
   CPC ............ *G01P 15/18* (2013.01); *G01P 15/125* (2013.01); *G01P 2015/0814* (2013.01)

(58) Field of Classification Search
   CPC .................. G01P 15/18; G01P 15/125; G01P 2015/0814; G01P 2015/084; G01P 2015/0828; G01P 2015/0831; G01P 2015/0822–0842
   See application file for complete search history.

(56) References Cited

U.S. PATENT DOCUMENTS

| | | | |
|---|---|---|---|
| 6,223,598 B1 * | 5/2001 | Judy | G01P 15/18 73/514.32 |
| 6,845,670 B1 | 1/2005 | McNeil et al. | |
| 7,258,011 B2 | 8/2007 | Nasiri et al. | |
| 7,461,552 B2 * | 12/2008 | Acar | G01P 15/125 73/504.04 |

(Continued)

FOREIGN PATENT DOCUMENTS

| | | |
|---|---|---|
| CN | 1844934 A | 10/2006 |
| CN | 101069099 A | 11/2007 |

(Continued)

OTHER PUBLICATIONS

Machine Translation of CN204731265U (Year: 2020).*

(Continued)

*Primary Examiner* — David L Singer
(74) *Attorney, Agent, or Firm* — Wolf, Greenfield & Sacks, P.C.

(57) ABSTRACT

Microelectromechanical system (MEMS) accelerometers are described. The MEMS accelerometers may include multiple proof mass portions collectively forming one proof mass. The entirety of the proof mass may contribute to detection of in-plane acceleration and out-of-plane acceleration. The MEMS accelerometers may detect in-plane and out-of-plane acceleration in a differential fashion. In response to out-of-plane accelerations, some MEMS accelerometers may experience butterfly modes, where one proof mass portion rotates counterclockwise relative to an axis (Continued)

while at the same time another proof mass portion rotates clockwise relative to the same axis. In response to in-plane acceleration, the proof mass portions may experience common translational modes, where the proof mass portions move in the plane along the same direction.

20 Claims, 12 Drawing Sheets

(56) References Cited

U.S. PATENT DOCUMENTS

| | | | |
|---|---|---|---|
| 7,757,555 | B2 | 7/2010 | Pan et al. |
| 8,539,836 | B2 | 9/2013 | McNeil |
| 8,739,626 | B2 | 6/2014 | Acar |
| 8,978,475 | B2 | 3/2015 | Acar |
| 9,062,972 | B2 | 6/2015 | Acar et al. |
| 9,246,017 | B2 | 1/2016 | van der Heide et al. |
| 9,360,496 | B2 | 6/2016 | Naumann |
| 9,455,354 | B2 | 9/2016 | Acar |
| 9,989,364 | B2 | 6/2018 | Comi et al. |
| 2006/0037397 | A1* | 2/2006 | Memishian ........... G01P 15/125 73/514.32 |
| 2008/0092652 | A1* | 4/2008 | Acar ................... G01C 19/5712 73/504.02 |
| 2009/0007667 | A1 | 1/2009 | Cardarelli |
| 2009/0064780 | A1* | 3/2009 | Coronato ................ G01P 15/14 73/504.08 |
| 2010/0122579 | A1 | 5/2010 | Hsu et al. |
| 2013/0125649 | A1 | 5/2013 | Simoni et al. |
| 2013/0192364 | A1 | 8/2013 | Acar |
| 2013/0270657 | A1* | 10/2013 | Acar ....................... G01P 15/18 257/415 |
| 2014/0090469 | A1* | 4/2014 | Comi .................... G01P 15/097 73/504.12 |
| 2014/0208849 | A1 | 7/2014 | Zhang |
| 2015/0355222 | A1* | 12/2015 | Zhang .................. G01P 15/125 73/514.32 |
| 2016/0097791 | A1* | 4/2016 | Zhang .................. B81B 3/0021 73/514.32 |
| 2017/0234684 | A1* | 8/2017 | Coronato ........... G01C 19/5747 73/504.12 |
| 2017/0328931 | A1 | 11/2017 | Zhang et al. |
| 2018/0172445 | A1 | 6/2018 | Prikhodko et al. |
| 2018/0172447 | A1 | 6/2018 | Prikhodko et al. |
| 2018/0238925 | A1 | 8/2018 | Acar et al. |
| 2018/0275161 | A1 | 9/2018 | Tang |
| 2019/0033341 | A1 | 1/2019 | Song et al. |
| 2020/0096538 | A1 | 3/2020 | Zhang et al. |

FOREIGN PATENT DOCUMENTS

| | | |
|---|---|---|
| CN | 101568840 A | 10/2009 |
| CN | 101738496 A | 6/2010 |
| CN | 102134053 A | 7/2011 |
| CN | 102323449 A | 1/2012 |
| CN | 102356324 A | 2/2012 |
| CN | 102539830 A | 7/2012 |
| CN | 102997905 A | 3/2013 |
| CN | 203720200 U | 7/2014 |
| CN | 104094084 A | 10/2014 |
| CN | 104931729 A | 9/2015 |
| CN | 204 731 265 U | 10/2015 |
| CN | 106290984 A | 1/2017 |
| CN | 106950398 A | 7/2017 |
| CN | 107110887 A | 8/2017 |
| CN | 107209204 A | 9/2017 |
| CN | 107867670 A | 4/2018 |
| CN | 108204806 A | 6/2018 |
| CN | 108450009 A | 8/2018 |
| EP | 0675375 A2 | 10/1995 |
| WO | WO 2004/077073 A1 | 9/2004 |
| WO | WO 2016/108770 A1 | 7/2016 |

OTHER PUBLICATIONS

Sudha et al, Design and analysis of serpentine based MEMS accelerometer, AIP Conference Proceedings 1966, 020026 (2018) (Year: 2018).*

Second machine translation of CN204731265U (Year: 2021).*

Extended European Search Report dated Feb. 27, 2020 in connection with European Application No. 19201892.7.

Hollocher et al., A Very Low Cost, 3-axis, MEMS Accelerometer for Consumer Applications. IEEE Sensors 2009 Conference. 2009; p. 953-957.

Lemkin et al., A 3-Axis Force Balance Accelerometer Using a Single Proof-Mass. Transducers' 97. 1997 International Conference on Solid-State Sensors and Actuators. Chicago. Jun. 16-19, 1997: p. 1185-1188.

Sun et al., Implementation of a Monolithic Single Proof-Mass Tri-Axis Accelerometer Using CMOS-MEMs Technique. IEEE Transactions on Electron Devices. Jul. 2010; 57(7):1670-9.

Tsai et al., A 400 × 400μm2 3-Axis CMOS-MEMS Accelerometer with Vertically Integrated Fully-Differential Sensing Electrodes. Transducers' 11. Beijing, China. Jun. 5-9, 2011; p. 811-814.

Tsuchiya et al., Design and Fabrication of a Differential Capacitive Three-Axis SOI Accelerometer Using Vertical Comb Electrodes. Transactions on Electrical and Electrical Engineering. IEEJ Trans 2009; 4:345-351.

Xu et al., Design and Fabrication of a Slanted-Beam MEMS Accelerometer. micromachines. 2017;8(77): 12 pages.

Yuan et al., Micromachined tri-axis capacitive accelerometer based on the single mass. Key Engineering Materials. 2015;645-646:630-5.

EP 19201892.7, dated Feb. 27, 2020, Extended European Search Report.

* cited by examiner

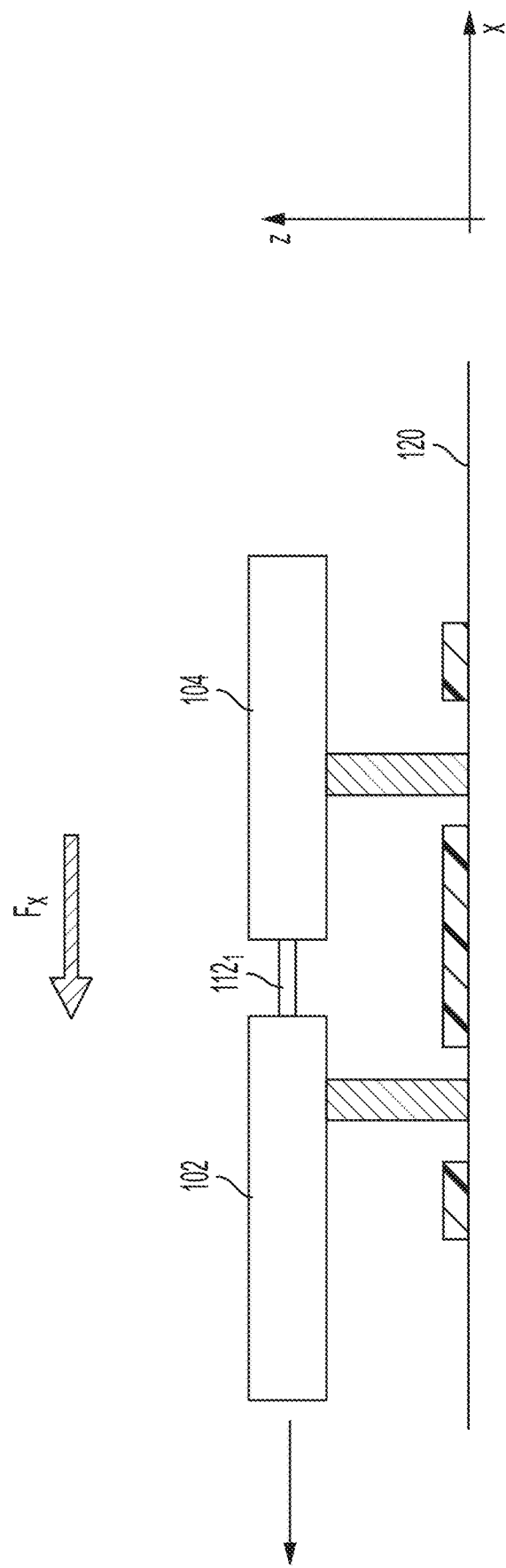

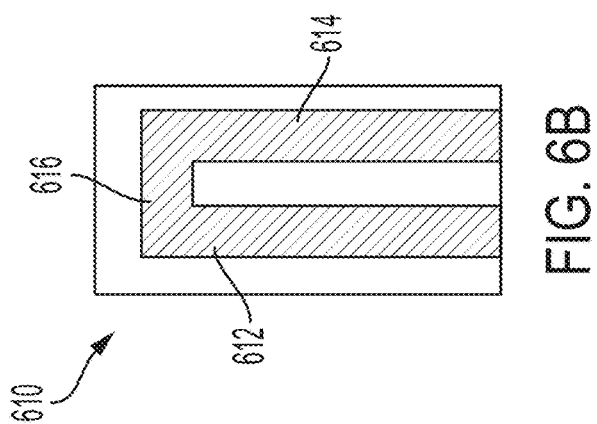
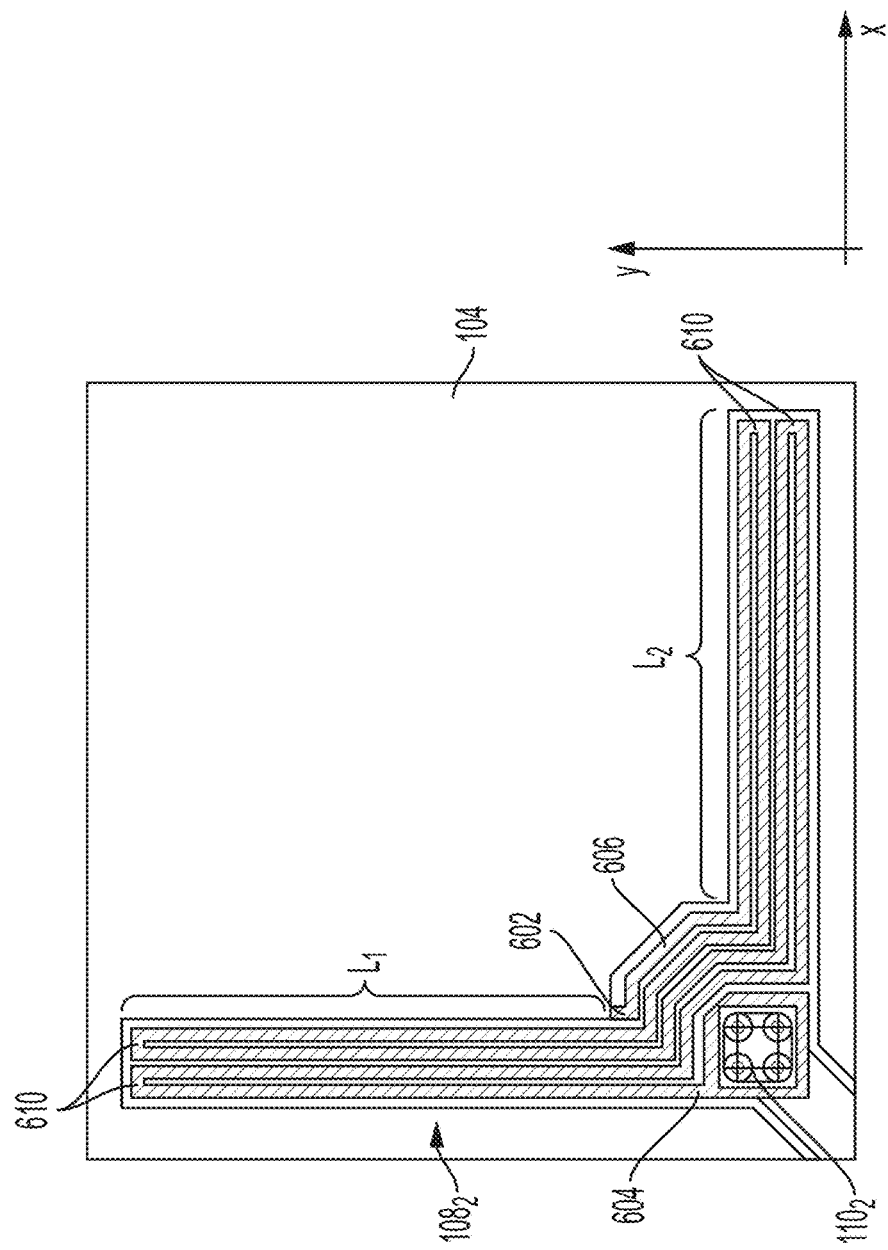

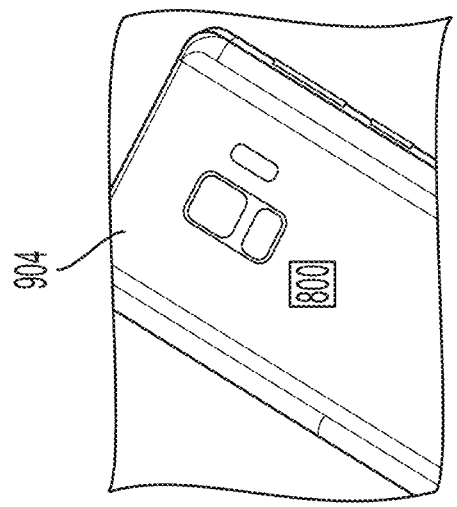
FIG. 9C
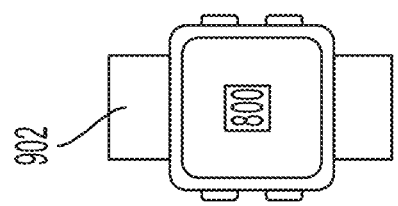
FIG. 9B
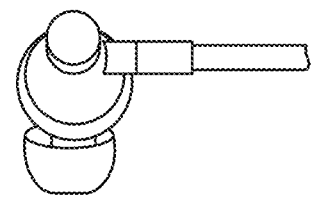
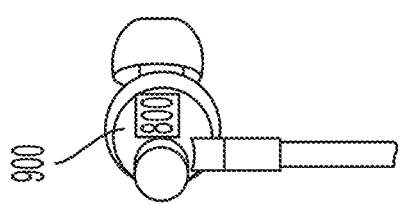
FIG. 9A

LOW-NOISE MULTI-AXIS ACCELEROMETERS AND RELATED METHODS

FIELD OF THE DISCLOSURE

The technology described in the present application relates to microelectromechanical system (MEMS) accelerometers.

BACKGROUND

MEMS accelerometers include one or more proof masses for detecting acceleration. For example, some MEMS accelerometers include a proof mass configured to move in-plane for detecting acceleration in the plane of the proof mass, and a proof mass configured to move out-of-plane for detecting acceleration perpendicular to the plane of the proof mass. Acceleration can be detected using capacitive sensors coupled to the proof mass.

SUMMARY OF THE DISCLOSURE

Some embodiments are directed to microelectromechanical system (MEMS) accelerometers. The MEMS accelerometers may include multiple proof mass portions collectively forming one proof mass. The entirety of the proof mass may contribute to detection of in-plane acceleration (in one or two directions) and out-of-plane acceleration. The MEMS accelerometers may detect in-plane and out-of-plane acceleration in a differential fashion. In response to out-of-plane accelerations, some MEMS accelerometers may experience butterfly modes, where one proof mass portion rotates counterclockwise relative to an axis while at the same time another proof mass portion rotates clockwise relative to the same axis. In response to in-plane acceleration, the proof mass portions may experience common translational modes, where the proof mass portions move in the plane along the same direction.

Some embodiments are directed to a microelectromechanical system (MEMS) accelerometer comprising a proof mass comprising first and second portions defining a plane and connected to each other by a coupler. In response to out-of-plane acceleration, the first portion of the proof mass is configured to rotate clockwise relative to an axis and the second portion of the proof mass is configured to rotate counterclockwise relative to the axis. The MEMS accelerometer further comprises a first sensor configured to sense in-plane motion of the proof mass in a first direction and a second sensor configured to sense in-plane motion of the proof mass in a second direction different from the first direction.

In some embodiments, the first portion of the proof mass is connected to a substrate by a first anchor and the second portion of the proof mass is connected to the substrate by a second anchor.

In some embodiments, the first portion of the proof mass is connected to the first anchor by a tether that is: compliant with respect to translation of the first portion of the proof mass in the first direction, compliant with respect to translation of the first portion of the proof mass in the second direction, compliant with respect to out-of-plane rotation of the first portion of the proof mass, and stiff with respect to out-of-plane translation of the first portion of the proof mass.

In some embodiments, the first portion of the proof mass is connected to the first anchor by a tether comprising a first switchback portion and a second switchback portion, the first and second switchback portions being oriented substantially perpendicularly relative to each other.

In some embodiments, in response to the out-of-plane acceleration, the first portion of the proof mass is configured to rotate about a rotation axis that is offset in the plane relative to the first anchor.

In some embodiments, the coupler is L-shaped and comprises a plurality of switchback portions.

In some embodiments, the coupler is configured to prevent simultaneous clockwise rotational motion of the first and second portions of the proof mass.

In some embodiments, the coupler comprises a switchback portion, a first end fixed to the first portion of the proof mass, and a second end fixed to the second portion of the proof mass.

In some embodiments, the MEMS accelerometer further comprises a third sensor configured to sense out-of-plane motion of the proof mass.

In some embodiments, the first sensor comprises a first finger configured to form a first sense capacitor with the first portion of the proof mass and the second sensor comprises a second finger configured to form a second sense capacitor with the second portion of the proof mass.

Some embodiments are directed to a method for sensing acceleration using a microelectromechanical system (MEMS) accelerometer having first and second proof mass portions defining a plane. The method comprises sensing in-plane acceleration of the MEMS accelerometer in a first direction parallel to the plane; sensing in-plane acceleration of the MEMS accelerometer in a second direction parallel to the plane and different from the first direction; and sensing out-of-plane acceleration of the MEMS accelerometer. Sensing out-of-plane acceleration of the MEMS accelerometer comprises sensing clockwise rotational motion of the first proof mass portion, and sensing counterclockwise rotational motion of the second proof mass portion. The clockwise rotational motion of the first proof mass portion and the counterclockwise rotational motion of the second proof mass portion are defined relative to a common axis.

In some embodiments, sensing out-of-plane acceleration of the MEMS accelerometer comprises sensing clockwise rotational motion of the first proof mass portion and sensing counterclockwise rotational motion of the second proof mass portion simultaneously.

In some embodiments, sensing clockwise rotational motion of the first proof mass portion comprises sensing a variation in a separation between the first proof mass portion and a substrate to which the first proof mass portion is connected.

In some embodiments, sensing in-plane acceleration of the MEMS accelerometer in the first direction comprises sensing a variation in a separation between the first proof mass portion and an electrode positioned at least partially in the plane.

In some embodiments, sensing out-of-plane acceleration of the MEMS accelerometer further comprises sensing counterclockwise rotational motion of the first proof mass portion, and sensing clockwise rotational motion of the second proof mass portion. The counterclockwise rotational motion of the first proof mass portion and the clockwise rotational motion of the second proof mass portion are defined relative to the common axis.

Some embodiments are directed to a microelectromechanical system (MEMS) accelerometer comprising a proof mass comprising first and second portions defining a plane and connected to each other by a coupler. The first and second proof mass portions are configured to: in response to in-plane acceleration, experience a common translational mode in the plane, and in response to out-of-plane acceleration, experience a butterfly mode.

In some embodiments, the first portion of the proof mass is connected to a substrate by an anchor, and wherein the first portion of the proof mass is connected to the anchor by a tether comprising a first switchback portion and a second switchback portion, the first and second switchback portions being oriented substantially perpendicularly relative to each other.

In some embodiments, the first portion of the proof mass is connected to a substrate by an anchor, and wherein, in response to out-of-plane acceleration, the first portion of the proof mass is configured to rotate about a rotation axis that is offset in the plane relative to the anchor.

In some embodiments, the coupler is configured to prevent simultaneous clockwise rotational motion of the first and second proof mass portions.

In some embodiments, the coupler comprises a switchback portion, a first end fixed to the first portion of the proof mass, and a second end fixed to the second portion of the proof mass.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 3B is a side view illustrating schematically the MEMS accelerometer of FIG. 3A in the presence of in-plane acceleration, according to some non-limiting embodiments.

FIG. 6A is a schematic diagram illustrating a tether of the MEMS accelerometer of FIG. 5 in additional detail, according to some non-limiting embodiments.

FIG. 6B is a schematic diagram illustrating a portion of the tether of FIG. 6A in additional detail, according to some non-limiting embodiments.

FIG. 9A is a schematic diagram illustrating a pair of headphones including the system of FIG. 8, according to some non-limiting embodiments.

FIG. 9B is a schematic diagram illustrating a smartwatch including the system of FIG. 8, according to some non-limiting embodiments.

FIG. 9C is a schematic diagram illustrating a smartphone including the system of FIG. 8, according to some non-limiting embodiments.

DETAILED DESCRIPTION

Figure 1A:
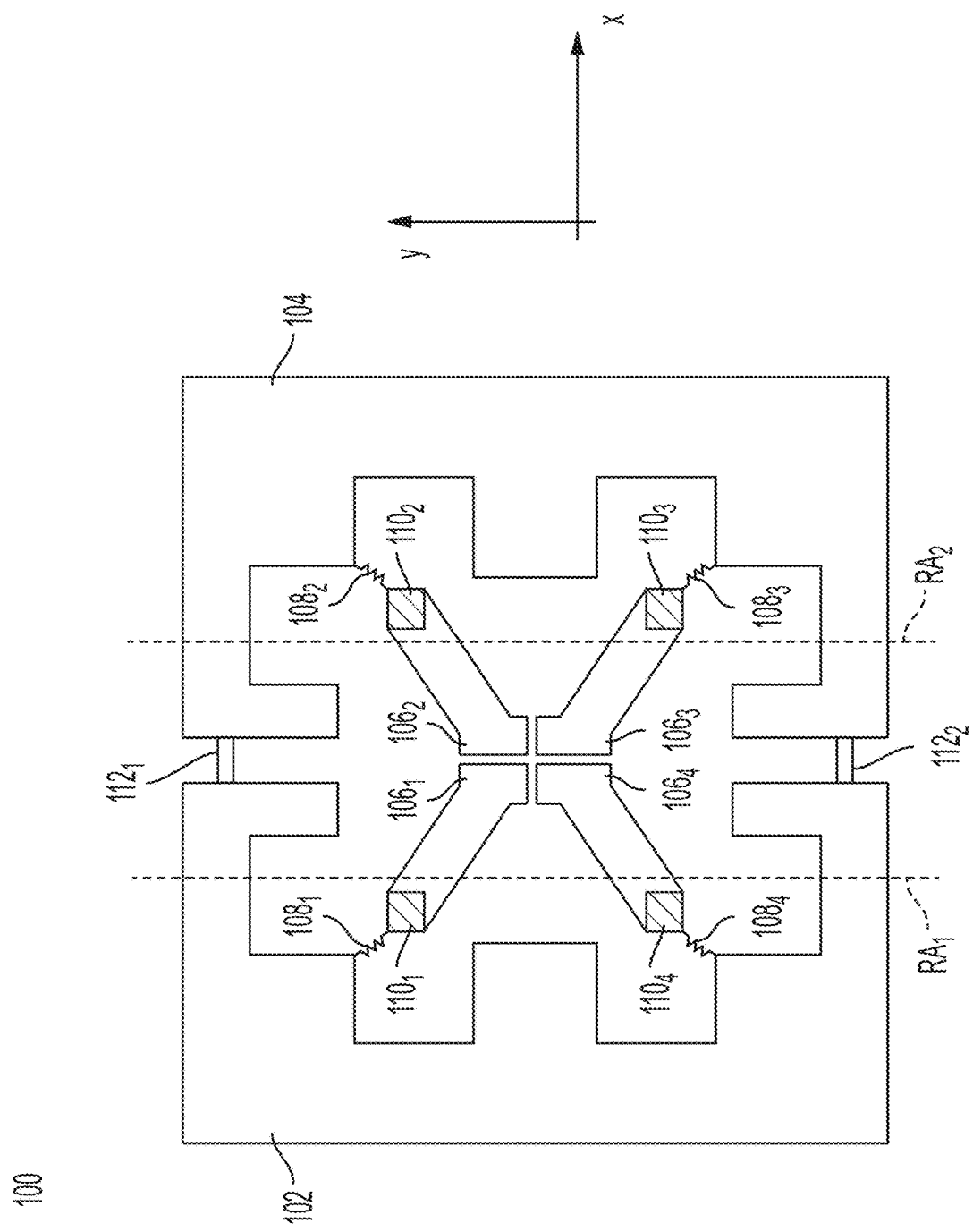
FIG. 1A is a top view illustrating schematically an example of a MEMS accelerometer, according to some non-limiting embodiments.

Aspects of the present application relate to multi-axis MEMS accelerometers in which a common proof mass contributes to the detection of in-plane acceleration (along one or two axes) and out-of-plane acceleration. This is unlike some other types of MEMS accelerometers in which a proof mass contributes to the detection of out-of-plane acceleration but not in-plane acceleration, and another proof mass contributes to the detection of in-plane acceleration but not out-of-plane acceleration. Applicant has appreciated that having a common proof mass contributing to the detection of acceleration in different directions can beneficially result in a substantial reduction of the size of the accelerometer. In fact, a single proof mass can replace multiple proof masses. Some MEMS accelerometers of the types described herein, for example, have areas as small as 9 mm$^2$, as a non-limiting example. MEMS accelerometers having compact form-factors are advantageous because they 1) limit on-chip real estate utilization, thus freeing up space for other devices, 2) reduce the amount of power consumed to operate an accelerometer, and 3) broaden the range of applications in which these accelerometers can be effectively utilized.

Further aspects of the present application relate to MEMS accelerometers in which a common proof mass contributes to the detection of acceleration along multiple axes, and in which acceleration is detected differentially. Applicant has further appreciated that enabling a common proof mass to detect acceleration differentially along multiple axes may significantly increase an accelerometer's sensitivity, thus making the accelerometer less susceptible to noise. Hence, MEMS accelerometers of the types described herein are suitable for use in low-noise applications, in which the acceleration to be detected is weak (e.g., leg or less).

An example of a multi-axis, differential, common proof mass MEMS accelerometer according to one aspect of the present application includes an accelerometer designed to respond to out-of-plane acceleration with a "butterfly mode" (also referred to herein as "bird mode," "wing mode," "flap mode," or "flapping mode"). In some embodiments, an accelerometer is arranged to move according to a butterfly mode such that a first portion of the proof mass rotates clockwise relative to an axis when a second portion of the proof mass (coupled to the first portion of the proof mass) rotates counterclockwise relative to the same axis.

Leveraging the fact that one proof mass portion moves in one direction while another proof mass portion moves in another direction, butterfly mode accelerometers of the types described herein detect out-of-plane acceleration in a differential fashion. Detection of in-plane acceleration may be achieved in some embodiments by allowing the proof mass portions to experience a "common translational mode" responsive to in-plane acceleration, whereby different portions of the proof mass translate in the plane along the same direction.

Accordingly, some embodiments are directed to a MEMS accelerometer including a proof mass having multiple portions, where the proof mass portions are configured to respond to out-of-plane acceleration with a butterfly mode and to respond to in-plane acceleration with a common translational mode.

Aspects of the present application relate to tethers designed to enable butterfly modes responsive to out-of-plane acceleration and common translational modes responsive to in-plane acceleration. Such tethers, which couple the proof mass to the underlying substrate, may be deigned to be 1) compliant with respect to in-plane translation of the proof mass, 2) compliant with respect to out-of-plane rotation of the proof mass, and 3) stiff with respect to out-of-plane translation of the proof mass. An example of a tether designed to respond in this manner includes switchback portions oriented substantially perpendicularly relative to each other (e.g., angularly offset relative to each other by an angle that is between 80° and 100°). Each switchback portion may provide compliance along one of the in-plane axes. Furthermore, the switchback portions may be arranged to collectively promote out-of-plane rotations of the proof mass and reject out-of-plane translation of the proof mass. In one specific example, a tether (e.g., one or more tethers) is provided which generally exhibits an L-shape, where each branch of the L includes one or more switchback portions.

Further aspects of the present application relate to couplers designed to enable butterfly modes responsive to out-of-plane acceleration and common translational modes responsive to in-plane acceleration. Such couplers, which couple different proof mass portions to each other, may be configured to 1) promote differential butterfly modes of the proof mass portions, and 2) reject common teeter-totter motion of the proof mass portions (whereby two proof mass portions rotate clockwise simultaneously relative to a common axis). Furthermore, such couplers may be configured to be stiff in the plane of the accelerometer, thus enabling the proof mass portions to move together when subject to in-plane acceleration. An example of a coupler designed to respond in this manner includes a switchback portion, a first end fixed to a first portion of the proof mass and a second end fixed to a second portion of the proof mass. It should be appreciated that these couplers may be employed in addition to or in alternative to the tethers described above. That is, promotion of butterfly modes responsive to out-of-plane acceleration and common translational modes responsive to in-plane acceleration may be achieved thanks to the couplers and/or the tethers described herein. It should also be appreciated that connectors other than the tethers and the couplers described herein may be additionally or alternatively be used to promote butterfly modes and common translational modes, as embodiments of the present application are not limited to any specific arrangement.

Applicant has further appreciated that the MEMS accelerometers described herein may be susceptible to out-of-plane translational modes arising in response to out-of-plane acceleration. Hence, when subject to out-of-plane acceleration, MEMS accelerometers of the types described herein may exhibit butterfly modes and out-of-plane translational modes. While butterfly modes are favorable because they enable differential detection of out-of-plane acceleration, out-of-plane translational modes are not because they give rise to common mode components in the detection signals.

In some embodiments, out-of-plane translational modes may be suppressed (or at least attenuated) by increasing the thickness of the accelerometer's proof mass. Thicker proof masses may be characterized by heavier weights, which in some embodiments translate into less motion when a force is applied onto the proof mass. In fact, the acceleration ($a_z$) of a proof mass in response to a force ($F_z$) applied perpendicularly relative to the plane of the proof mass is given by $a_z=F_z/m$, where m is the weight of the proof mass. Proof masses of the types described herein may have thicknesses that are as high as 30 μm or more in some embodiments.

FIG. 1A illustrates an example of a MEMS accelerometer, in accordance with some embodiments of the present application. MEMS accelerometer 100 includes proof mass portions 102 and 104, fixed sub-portions $106_1$, $106_2$, $106_3$ and $106_4$, tethers $108_1$, $108_2$, $108_3$ and $108_4$, anchors $110_1$, $110_2$, $110_3$ and $110_4$, and couplers $112_1$ and $112_2$. It should be appreciated that not all embodiments need to include all the components of FIG. 1A, and in some embodiments MEMS accelerometer 100 may include other components not shown in FIG. 1A. MEMS accelerometer 100 is configured to detect out-of-plane acceleration, such as acceleration directed along the z-axis. Fixed sub-portions $106_1$, $106_2$, $106_3$ and $106_4$ are collectively referred to as fixed portion 106. The fixed sub-portions may be physically detached from one another in some embodiments, as shown in FIG. 1A. In other embodiments, fixed sub-portions $106_1$, $106_2$, $106_3$ and $106_4$ may be attached to each other. Fixed portion 106 may be larger than each fixed sub-portion $106_1$, $106_2$, $106_3$ and $106_4$.

Proof mass portions 102 and 104 may be viewed as collectively forming one proof mass (thus forming a single proof mass accelerometer in some embodiments), or may be viewed as two separate proof masses in other embodiments. Whether viewed as forming a single proof mass or as being separate proof masses, proof mass portions 102 and 104 may be coupled to one another by couplers $112_1$ and $112_2$. Proof mass portions 102 and 104 may be made, at least partially, of a conductive material such as doped or undoped polysilicon. In some embodiments, proof mass portions 102 and 104 may have substantially the same weight (e.g., with weights within 10% of one another), though not all embodiments are limited in this respect.

Figure 1B:
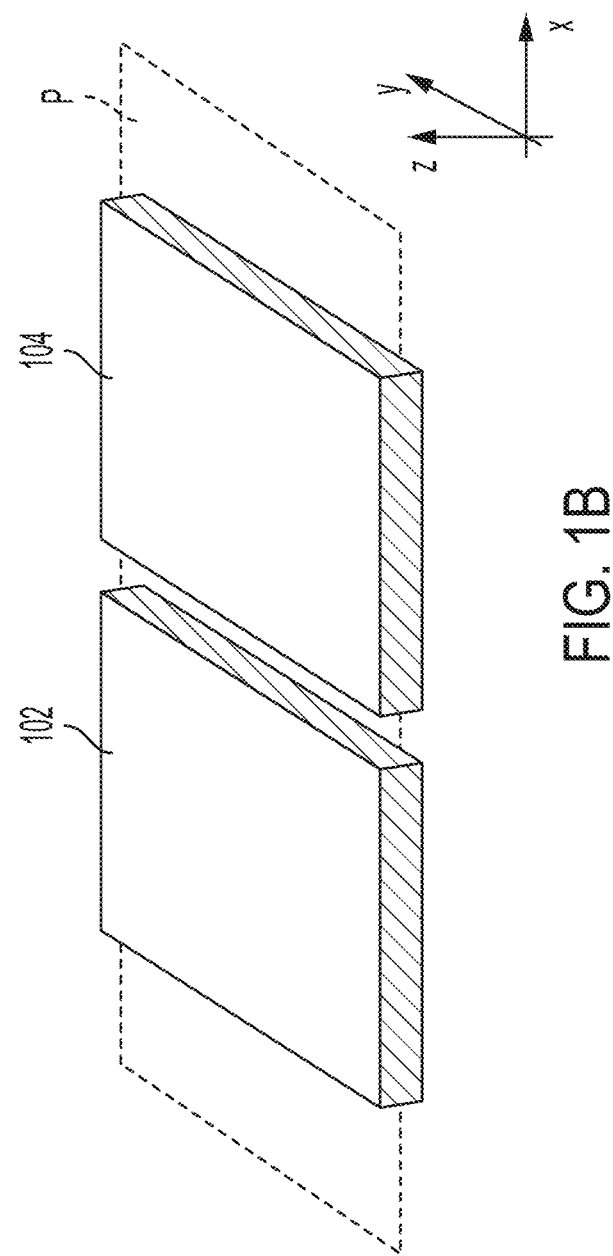
FIG. 1B is a schematic diagram illustrating a pair of proof mass portions that may be part of the MEMS accelerometer of FIG. 1A, according to some non-limiting embodiments.

Referring to FIG. 1B, proof mass portions 102 and 104 may be substantially parallel (e.g., with an angle between 0 degrees and 5 degrees) to the xy-plane, or may at least have one surface substantially parallel to the xy-plane. As such, proof masses 102 and 104 may define a plane ("P") substantially parallel to the xy-plane. Plane P may, for example, pass through the middle of proof mass portions 102 and 104, as illustrated in FIG. 1B, or may be otherwise be substantially parallel to a surface of one of the proof mass portions.

Referring back to FIG. 1A, fixed portion 106 may be attached to an underlying substrate 120 (see FIG. 2A) by anchors $110_1$, $110_2$, $110_3$ and $110_4$. For example, fixed sub-portion $106_1$ may be fixed to the substrate 120 by anchor $110_1$, fixed sub-portion $106_2$ may be fixed to the substrate 120 by anchor $110_2$, fixed sub-portion $106_3$ may be fixed to the substrate 120 by anchor $110_3$, and fixed sub-portion $106_4$ may be fixed to the substrate 120 by anchor $110_4$. In other embodiments, at least one (or all) of the sub-portions may be fixed to the substrate 120 by more than one anchor. In some embodiments, anchors $110_1$, $110_2$, $110_3$ and $110_4$ include columns extending primarily along the z-axis. Proof mass portion 102 may be connected to anchors $110_1$ and $110_4$ or other points of fixed portion 106 by tethers $108_1$ and $108_4$. Proof mass portion 104 may be connected to anchors $110_2$ and $110_3$ or other points of fixed portion 106 by tethers $108_2$ and $108_3$. As described in detail further below, tethers $108_1$, $108_2$, $108_3$ and $108_4$ may be arranged to promote out-of-plane rotation of proof mass portions 102 and 104, and to reject out-of-plane translation (for example along the z-axis) of proof mass portions 102 and 104.

Figure 2A:
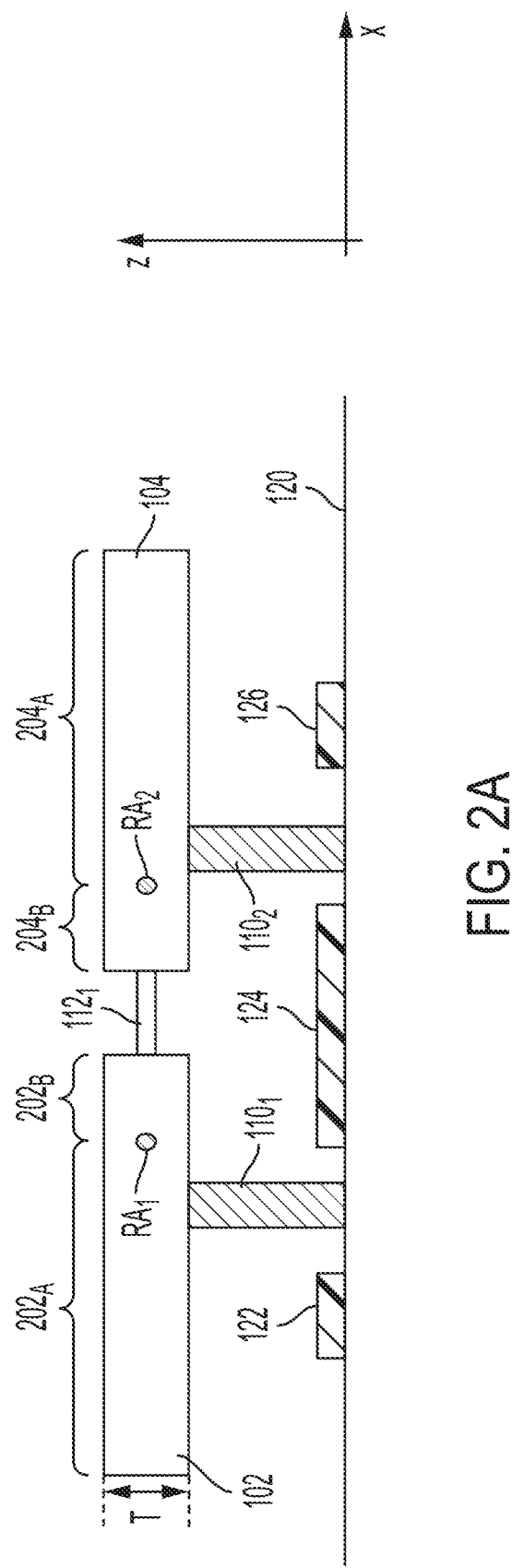
FIG. 2A is a side view illustrating schematically the MEMS accelerometer of FIG. 1A in the absence of out-of-plane acceleration, according to some non-limiting embodiments.

FIG. 2A is a side view of MEMS accelerometer 100, in accordance with some embodiments. As shown, coupler $112_1$ (together with coupler $112_2$, not shown in FIG. 2A) couple proof mass portions 102 and 104 to each other. It should be appreciated that, while coupler $112_1$ is illustrated as having a rectangular shape, this arrangement is provided solely as a non-limiting example, as the couplers described herein may have any suitable shape. One example of a coupler is described further below, with reference to FIGS. 7A-7B, according to some embodiments.

MEMS accelerometer 100 further includes electrodes 122, 124 and 126, which in some embodiments may serve as part of sensors for sensing out-of-plane acceleration. In some embodiments, electrodes 122, 124 and 126 may be disposed on the top surface of substrate 120, as illustrated in FIG. 2A, though in other embodiments they may at least partially be buried inside substrate 120.

Figure 2B:
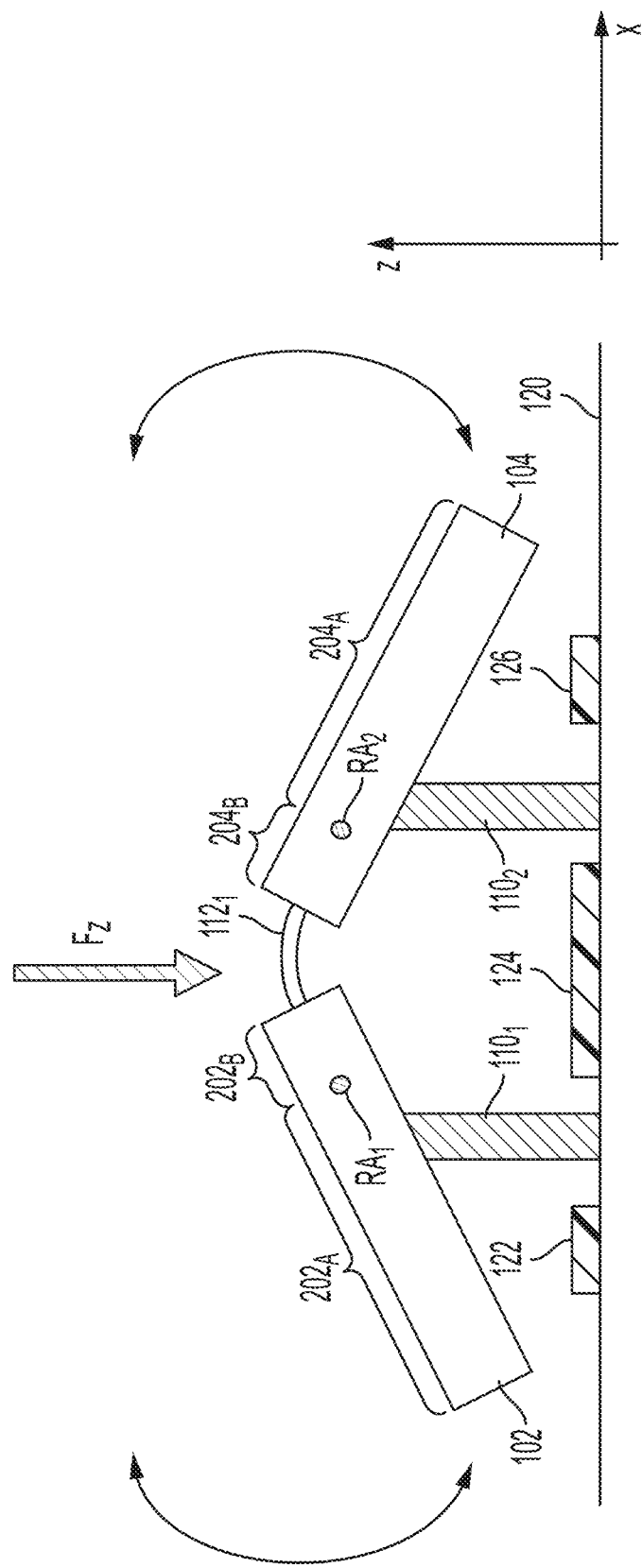
FIG. 2B is a side view illustrating schematically the MEMS accelerometer of FIG. 1A in the presence of out-of-plane acceleration, according to some non-limiting embodiments.

FIG. 2B is a side view illustrating how MEMS accelerometer 100 responds to out-of-plane acceleration, in accordance with some embodiments. In this example, MEMS accelerometer 100 accelerates along the z-axis and as a result is subject to a force oriented along the z-axis. Specifically, the force $F_z$ applied onto MEMS accelerometer 100 is directed towards the top surface of substrate 120. As shown, MEMS accelerometer responds to $F_z$ with a butterfly mode. In this example, proof mass portion 104 rotates clockwise relative to the y-axis when proof mass portion 102 rotates counterclockwise relative to the y-axis (though the opposite is also possible). As a result, the outer parts of proof mass portions 102 and 104 ($202_A$ and $204_A$, respectively) extend towards substrate 120 and the inner parts of proof mass portions 102 and 104 ($202_B$ and $204_B$, respectively) extend away from substrate 120. Outer parts $202_A$ and $204_A$ are defined between the respective outer edges of proof mass portions 102 and 104 and the respective rotation axes $RA_1$ and $RA_2$. Inner parts $202_B$ and $204_B$ are defined between the respective inner edges of proof mass portions 102 and 104 and the respective rotation axes $RA_1$ and $RA_2$. In this example, outer parts $202_A$ and $204_A$ are illustrated as being larger, and hence heavier, than inner parts $202_B$ and $204_B$. It should be appreciated however that other arrangements are also possible, including an arrangement in which inner parts $202_B$ and $204_B$ are heavier than outer parts $202_A$ and $204_A$. In such an arrangement, inner parts $202_B$ and $204_B$ would extend towards substrate 120 in response to $F_z$, and outer parts $202_A$ and $204_A$ would extend away from substrate 120 in response to $F_z$.

In some embodiments, an accelerometer of the types described herein is arranged to move according to a butterfly mode such that proof mass portion 102 rotates clockwise relative to an axis when proof mass portion 104 rotates counterclockwise relative to the same axis. In some embodiments, an accelerometer of the types described herein is arranged to move according to a butterfly mode such that proof mass portions 102 and 104 rotate approximately by the same amount but in opposite angles. In some embodiments, an accelerometer of the types described herein is arranged to move according to a butterfly mode such that proof mass portions 102 and 104 exhibit mirror symmetry with respect to the z-axis as the rotate.

In some embodiments, proof mass portions 102 and 104 may rotate about rotations axes that are laterally offset in the xy-plane relative to the location of the anchors. For example, in FIGS. 1A, 2A-2B, axes $RA_1$ and $RA_2$ define the rotation axes of proof masses 102 and 104, respectively. As shown in these figures, rotation axes $RA_1$ and $RA_2$ are offset relative to the anchors towards the lighter parts (e.g., $202_B$ and $204_B$ in this case) of the respective proof mass portions. According to one aspect of the present application, the rotation axes are offset relative to the location of the anchors due to the fact that, responsive to out-of-plane acceleration, proof mass portions 102 and 104 experience a translation parallel the z-axis in addition to the butterfly mode. Hence, a mode arises which results from the combination of the butterfly mode with the z-axis translation mode. The combined mode causes the rotation axis to move towards the lighter parts proof mass portions. While FIGS. 1A, 2A-2B illustrate rotational axes being offset relative to the locations of the anchors, not all embodiments are limited in this respect as, in some embodiments, axes $RA_1$ and $RA_2$ may be aligned to the locations of the anchors.

In some embodiments, the z-axis translational mode may be attenuated by increasing the thickness T (see FIG. 2A) of the proof mass portions 102 and 104. Conventional MEMS accelerometers have proof masses with thicknesses less than 16 μm, where the thickness is dictated by the fabrication process available at the manufacturing facility. In some embodiments, increasing the thickness of the proof mass portions 102 and 104 beyond 16 μm may increase the weight of the proof mass, which may in turn reduce the extent to which the proof mass translates responsive to out-of-plane acceleration. For example, thickness T may be between 16 μm and 100 μm, between 16 μm and 75 μm, between 16 μm and 50 μm, between 16 μm and 40 μm, between 16 μm and 35 μm, between 16 μm and 30 μm, between 20 μm and 45 μm, between 20 μm and 40 μm, between 20 μm and 35 μm, between 20 μm and 30 μm, between 25 μm and 45 μm, between 25 μm and 40 μm, between 25 μm and 35 μm, between 25 μm and 30 μm, or within any range within such ranges. In some embodiments, thickness T may be 30 μm. In some embodiments, increasing the thickness T relative to conventional MEMS devices may be achieved by selecting a fabrication process providing thicker MEMS layers. It should be appreciated that T may be greater than 100 μm in some embodiments. It should be further appreciated that T may be less than 16 μm in some embodiments. In some embodiments, T may be between 10 μm and 100 μm, between 10 μm and 75 μm, between 10 μm and 50 μm, between 10 μm and 40 μm, between 10 μm and 35 μm, between 10 μm and 30 μm, between 5 μm and 100 μm, between 5 μm and 75 μm, between 5 μm and 50 μm, between 5 μm and 40 μm, between 5 μm and 35 μm, or between 5 μm and 30 μm, among other possible ranges.

Detection of out-of-plane acceleration may be performed using capacitive sensors, in some embodiments. In the example of FIG. 2B, capacitive sensors are formed between electrodes 122, 124 and 126 and proof mass portions 102 and 104. For example, one capacitive sensor is formed between electrode 122 and part $202_A$ of proof mass portion 102; one capacitive sensor is formed between electrode 124 and part $202_B$ of proof mass portion 102 and part $204_B$ of proof mass portion 104; one capacitive sensor is formed between electrode 126 and part $204_A$ of proof mass portion 104. Detection of the motion of the proof mass portions may be achieved by sensing variations in the capacitances on such capacitive sensors. In the case of FIG. 2B, for example, the separation between part $202_A$ and electrode 122 decreases relative to FIG. 2A, and as a result the capacitance of this capacitive sensor increases. Similarly, the separation between part $204_A$ and electrode 126 decreases relative to FIG. 2A, and as a result the capacitance of this capacitive sensor increases. At the same time, the separation between parts $202_B$ and $204_B$ (on one side) and electrode 124 (on the other side) increases relative to FIG. 2A, and as a result the capacitance of this capacitive sensor decreases. Because the capacitance of the outer capacitive sensors increases while the capacitance of the inner capacitive sensor decreases, out-of-plane acceleration can be detected differentially. For example, the signal (e.g., voltage or current) at electrode 122 may be added to the signal at electrode 126, and the resulting signal may be subtracted from the signal at electrode 124. These operations may be performed in the analog or digital domain using sense circuitry (not shown in FIG. 2B) coupled to electrodes 122, 124 and 126.

Being configured to detect out-of-plane acceleration in a differential fashion, in some embodiments, MEMS accelerometer 100 may lack reference sense capacitors having fixed capacitances. Reference sense capacitors having fixed capacitances (where the capacitance does not vary with acceleration) are often used in single-ended accelerometers for providing a reference signal against which a single-ended signal is compared.

While the example of FIG. 1A illustrates a MEMS accelerometer having two proof mass portions, the MEMS accelerometers described herein are not limited to any specific number of proof mass portions. In some embodiments, for example, a proof mass may include four proof mass portions coupled to each other and disposed in respective quadrants. Responsive to out-of-plane acceleration, the proof mass portions may rotate in a manner similar to that described with reference to FIG. 2B. For example, the inner parts of the proof mass portions may extend away from the underlying substrate while the outer parts of the proof mass portions extend towards the underlying substrate.

Figure 3A:
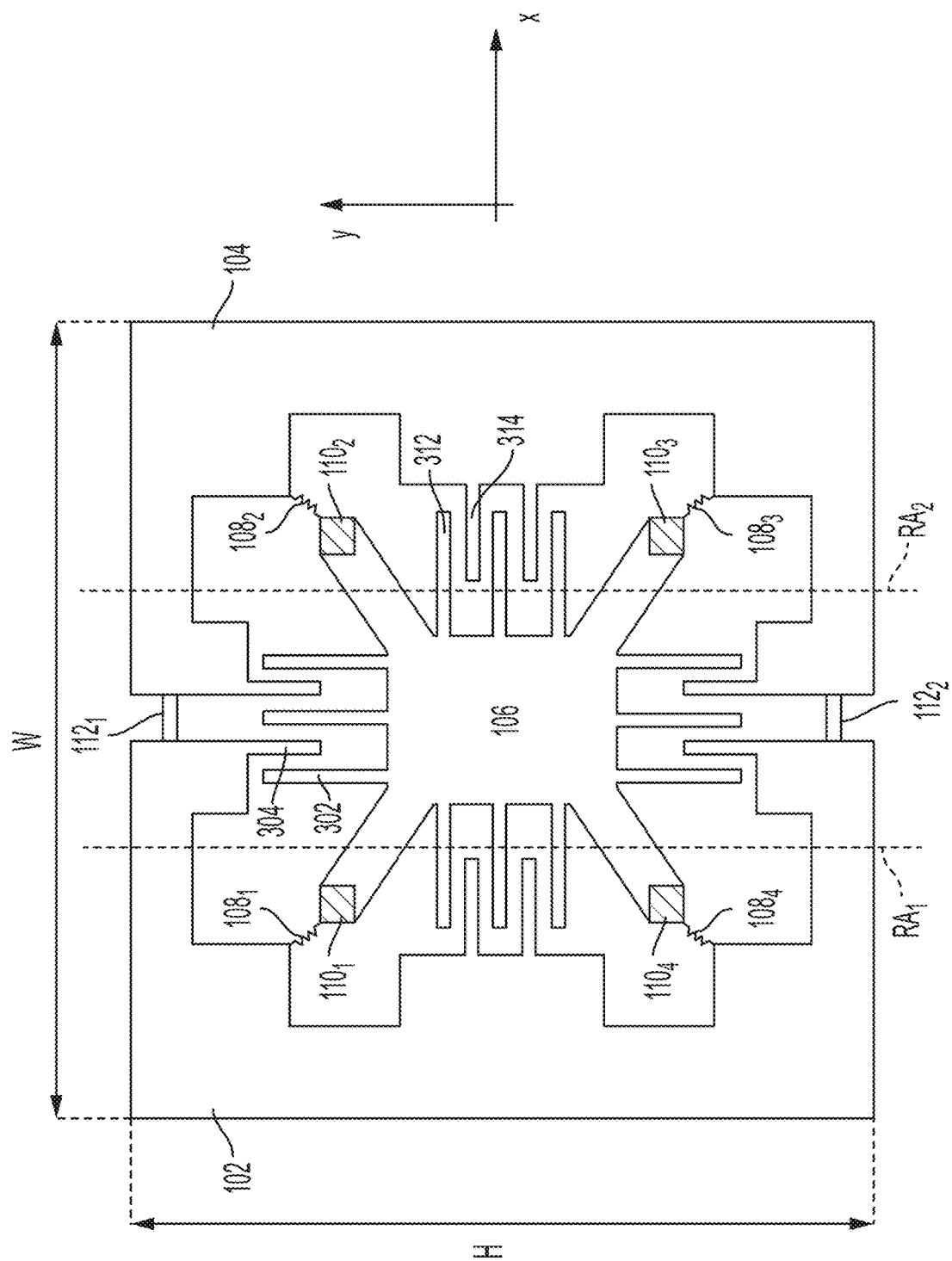
FIG. 3A is a top view illustrating schematically another example of a MEMS accelerometer, according to some non-limiting embodiments.

Aspects of the present application provide multi-axis MEMS accelerometers having proof mass portions arranged to experience butterfly modes in response to out-of-plane acceleration. FIG. 3A illustrates a MEMS accelerometer of this type, in accordance with some embodiments. Similar to the MEMS accelerometer of FIG. 1A, MEMS accelerometer 300 includes proof mass portions 102 and 104, fixed portion 106, tethers $108_1$, $108_2$, $108_3$ and $108_4$, anchors $110_1$, $110_2$, $110_3$ and $110_4$, and couplers $112_1$ and $112_2$. In addition, MEMS accelerometer 300 includes sensors for detecting in-plane acceleration (e.g., acceleration along a first direction and/or a second direction different from the first direction, such as a second direction perpendicular or substantially perpendicular to the first direction). For ease of illustration, fixed portion 106 is depicted in FIG. 3A as a single element. In some embodiments, however, a plurality of fixed sub-portions $106_1$, $106_2$, $106_3$, and $106_4$ (as illustrated for example in FIG. 1A) may be used.

MEMS accelerometer 300 may have a small form-factor, which may enable use of this device in a variety of contexts, including in portable devices. For example, MEMS accelerometer 300 may have an area HW (where H indicates the height of MEMS accelerometer 300 in the y-axis and W indicates the width in the x-axis) that is between 0.25 $mm^2$ and 30 $mm^2$, 0.5 $mm^2$ and 30 $mm^2$, 0.75 $mm^2$ and 30 $mm^2$, between 1 $mm^2$ and 30 $mm^2$, between 5 $mm^2$ and 30 $mm^2$, between 10 $mm^2$ and 30 $mm^2$, between 15 $mm^2$ and 30 $mm^2$, between 20 $mm^2$ and 30 $mm^2$, between 25 $mm^2$ and 30 $mm^2$, between 1 $mm^2$ and 20 $mm^2$, between 5 $mm^2$ and 20 $mm^2$, between 10 $mm^2$ and 20 $mm^2$, between 15 $mm^2$ and 20 $mm^2$, between 1 $mm^2$ and 15 $mm^2$, between 5 $mm^2$ and 15 $mm^2$, between 10 $mm^2$ and 15 $mm^2$, between 1 $mm^2$ and 10 $mm^2$, between 5 $mm^2$ and 10 $mm^2$, between 8 $mm^2$ and 10 $mm^2$, or within any range within such ranges. Other ranges are also possible. Areas smaller than 0.25 $mm^2$ are also possible in some embodiments. In the example of FIG. 3A, MEMS accelerometer 300 includes fingers 302, 304, 312 and 314. Fingers 304 extend along the y-axis and have respective ends fixed to proof mass portion 102, and similar fingers (with no reference numerals in FIG. 3A) extend along the y-axis and have respective ends fixed proof mass portion 104. These fingers form capacitive sensors with fingers 302, which extend along the y-axis and have respective ends fixed to fixed portion 106. Such capacitive sensors detect acceleration of MEMS accelerometer 300 along the x-axis. In some embodiments, the fingers are interdigitated, such that one finger extending from the proof mass is between two fingers extending from the fixed portion, and/or vice versa. As a result, when the capacitance of one capacitive sensor decreases the capacitance of the adjacent capacitive sensor increases, thus producing differential detection signals.

Fingers 314 extend along the x-axis and have respective ends fixed to proof mass portion 104, and similar fingers (with no reference numerals in FIG. 3A) extend along the x-axis and have respective ends fixed to proof mass portion 102. These fingers form capacitive sensors with fingers 312, which extend along the x-axis and have respective ends fixed to fixed portion 106. Such capacitive sensors detect acceleration of MEMS accelerometer 300 along the y-axis. In some embodiments, the fingers are interdigitated, such that one finger extending from the proof mass is between two fingers extending from the fixed portion, and/or vice versa. As a result, when the capacitance of one capacitive sensor decreases the capacitance of the adjacent capacitive sensor increases, thus producing differential detection signals.

In the MEMS accelerometer of FIG. 3A, tethers $108_1$, $108_2$, $108_3$ and $108_4$ may be designed to be 1) compliant with respect to translation of the proof mass portions along the x-axis, 2) compliant with respect to translation of the proof mass portions along the y-axis, 3) compliant with respect to out-of-plane rotation of the proof mass portions, and 4) stiff with respect to out-of-plane translation of the proof mass portions along the z-axis. Specific implementations of tethers $108_1$, $108_2$, $108_3$ and $108_4$ are described further below.

FIG. 3B is a side view of MEMS accelerometer 300 in the presence of an acceleration oriented along the x-axis, in accordance with some embodiments. When force Fx is applied onto MEMS accelerometer 300, proof mass portions 102 and 104 experience a common translational mode, whereby proof mass portions 102 and 104 move in the xy-plane along the same direction. In some embodiments, the common translational mode may be such that proof mass portion 102 moves along the x-axis to the same extent as does proof mass portion 104. To promote common translational modes in response to acceleration along the x-axis, couplers $112_1$ and $112_2$ may be designed to be stiff against motion of the proof mass portions along the x-axis. In this way, proof mass portions 102 and 104 may be held together (e.g., with a substantially constant separation) as they translate along the x-axis. Couplers $112_1$ and $112_2$ may be further designed to be stiff against motion of the proof masses portions along the y-axis. In this way, proof mass portions 102 and 104 may be held together as they translate along the y-axis. In some embodiments, couplers $112_1$ and $112_2$ may be further designed to reject teeter-totter modes, where the proof mass portions rotate clockwise simultaneously (or rotate counterclockwise simultaneously) relative to a common axis. Specific implementations of couplers $112_1$ and $112_2$ are described further below.

It should be appreciated that, in some embodiments, the entirety of the proof mass of MEMS accelerometer 300 may contribute to the detection of out-of-plane acceleration and in-plane acceleration. This is unlike other types of MEMS accelerometers in which a mass contributes to the detection of out-of-plane acceleration but not in-plane acceleration, and another mass contributes to the detection of in-plane acceleration but not out-of-plane acceleration.

Figure 4:
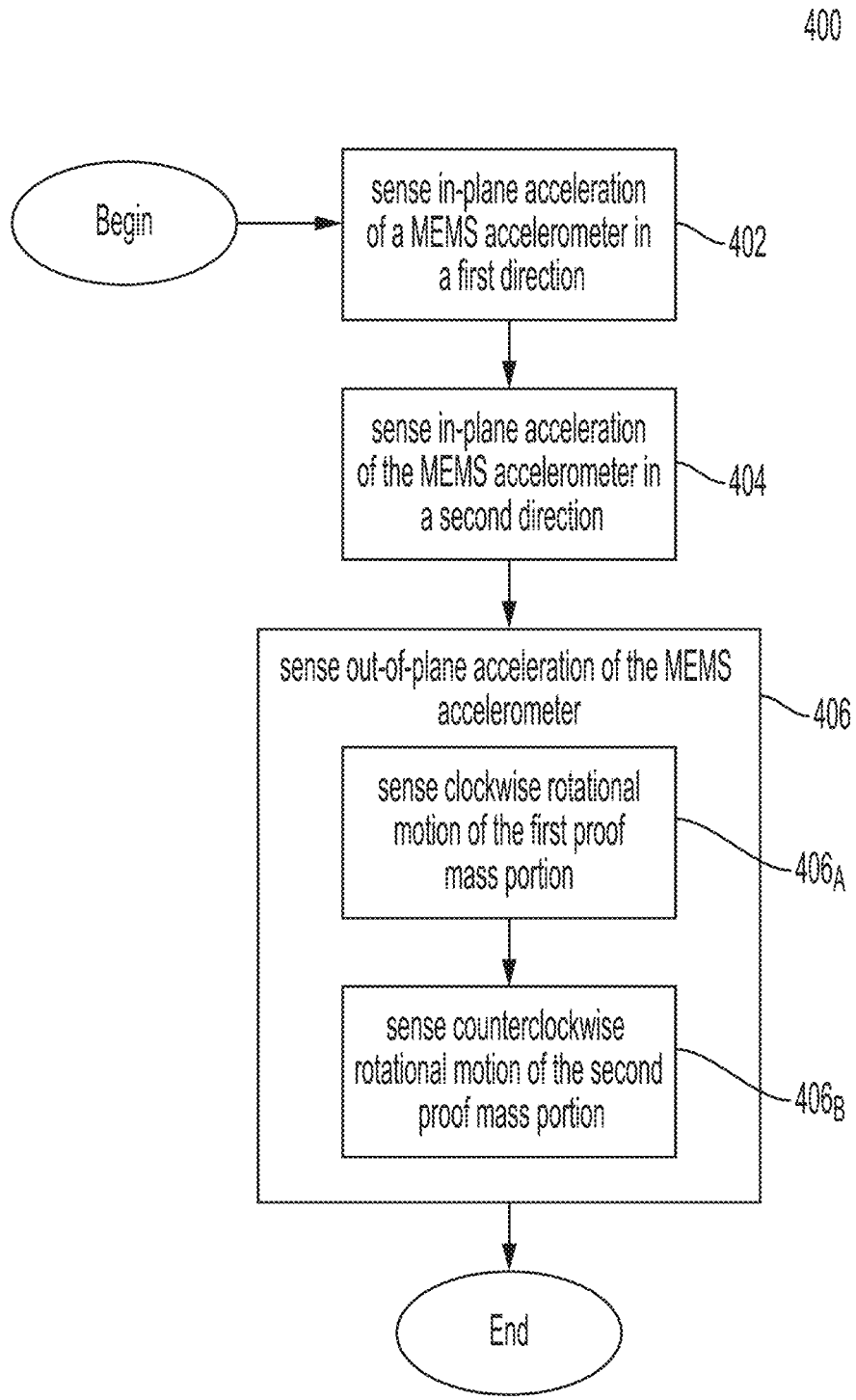
FIG. 4 is a flowchart illustrating a method for sensing acceleration using a MEMS accelerometer, according to some non-limiting embodiments.

FIG. 4 is a flowchart illustrating an example of a process for sensing acceleration in multiple directions, according to some embodiments. Process 400 may be performed using any suitable accelerometer, including for example MEMS accelerometer 300. Process 400 begins at act 402, in which a sensor senses in-plane acceleration of a MEMS accelerometer in a first direction. The sensor may include a capacitive sensor in some embodiments. In some embodiments, the sensor may further include sense circuitry coupled to the capacitive sensor. In one example, a sensor of MEMS accelerometer 300 may sense motion of the proof mass including proof mass portions 102 and 104 along the x-axis.

At act 404, a sensor (the same sensor of act 402 or a different sensor) senses in-plane acceleration of the MEMS accelerometer in a second direction different from (e.g., perpendicular to) the first direction. The sensor may include a capacitive sensor in some embodiments. In one example, a sensor of MEMS accelerometer 300 may sense motion of the proof mass including proof mass portions 102 and 104 along the y-axis.

At act 406, a sensor (the same sensor of act 402 or a different sensor) senses out-of-plane acceleration of the MEMS accelerometer. Sensing out-of-plane acceleration of the MEMS accelerometer may include 1) sensing clockwise rotational motion of a first proof mass portion of the MEMS accelerometer (act $406_A$) and 2) sensing counterclockwise rotational motion of a second proof mass portion of the MEMS accelerometer (act $406_B$), where the clockwise rotational motion of the first proof mass portion and the counterclockwise rotational motion of the second proof mass portion are defined relative to a common axis. In some embodiments, acts $406_A$ and $406_B$ may be performed simultaneously (e.g., such that at least part of act $406_A$ is performed at the same time as at least part of act $406_B$).

In some embodiments, an accelerometer of the types described herein may include means for allowing out-of-plane rotation of the proof mass, while resisting against out-of-plane translation of the proof mass. Such means may, in some embodiments, further allow in-plane translation of the prof mass. In some embodiments, an accelerometer of the types described herein may include means for differentially sensing out-of-plane acceleration, such as means for providing a butterfly mode.

Figure 5:
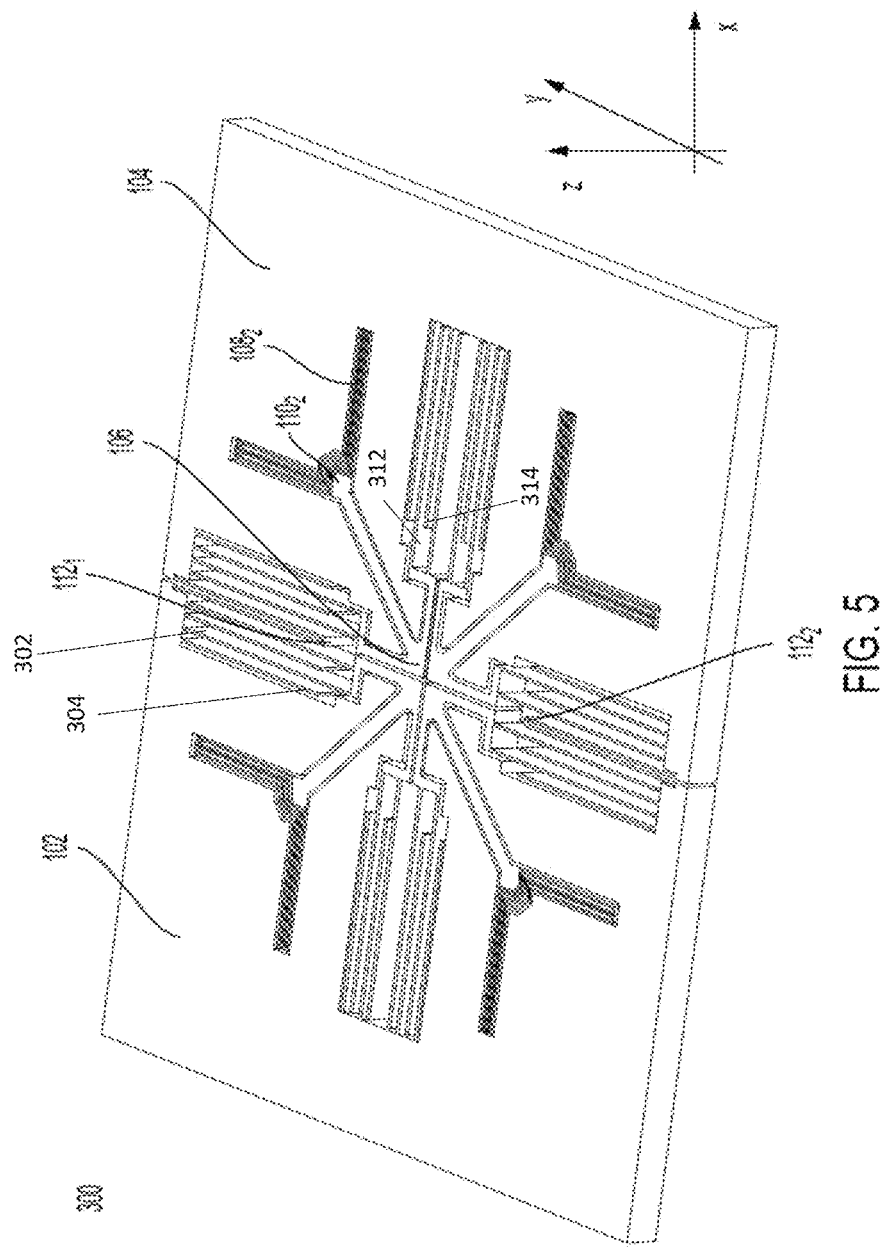
FIG. 5 is a schematic diagram illustrating yet another example of a MEMS accelerometer, according to some non-limiting embodiments.

FIG. 5 illustrates a specific implementation of MEMS accelerometer 300, in which tethers $108_1$, $108_2$, $108_3$ and $108_4$ generally exhibit L-shapes, an in which couplers $112_1$ and $112_2$ include switchback portions, in accordance with some embodiments.

FIG. 6A illustrates tether $108_2$ of the MEMS accelerometer of FIG. 5 in additional detail, in accordance with some embodiments. The other tethers of the MEMS accelerometer of FIG. 5 may be arranged according to the same general design. As shown, one end (602) of tether $108_2$ is connected to proof mass portion 104, and the other end (604) of tether $108_2$ is connected to anchor $110_2$. In this example, tether $108_2$ generally exhibits an L-shape, where one segment of the L ($L_1$) is substantially perpendicular (e.g., is offset by an angle between 80° and 100°) to the other segment of the L ($L_2$). It should be appreciated that not all embodiments include L-shaped tethers, as other embodiments may include tethers having generally squared shapes, generally rectangular shapes, or any other suitable shape. Segment $L_1$ may include beams extending primarily along the y-axis and segment $L_2$ may include beams extending primarily along the x-axis. The beams of segment $L_1$ may fold back and may be substantially parallel to each other. In one example, the beams of segment $L_1$ may be connected to each other by switchback portions 610, an example of which is illustrated in FIG. 6B in additional detail.

In the example of FIG. 6B, switchback portion 610 includes two substantially parallel beams (612 and 614) extending primarily along the y-axis, and one connecting beam (616) connecting beam 612 and 614 to each other. Connecting beam 616 may be oriented substantially perpendicular to beam 612 and 614. In other embodiments, switchback portion 610 may include a curved beam forming a 180° turn (or a turn between 170° and 190°). Switchback portion 610 may generally exhibit a U-shape, a C-shape, a V-shape, or any other suitable shape.

Referring back to FIG. 6A, the beams of segment $L_2$ may be connected to each other by switchback portions 610, which in some embodiments may be of the types described with reference to FIG. 6B. In some embodiments, the switchback portions of segment $L_1$ are oriented substantially perpendicularly relative to the switchback portions of segment $L_2$. For example, the connecting beam 616 of segment $L_1$ may be oriented substantially perpendicularly relative to the connecting beam 616 of segment $L_2$. The switchback portions of segment $L_1$ may provide compliance relative to in-plane motion of proof mass portion 104 along the x-axis. The switchback portions of segment $L_2$ may provide compliance relative to in-plane motion of proof mass portion 104 along the y-axis. Furthermore, the switchback portions of segments $L_1$ and $L_2$ may collectively promote out-of-plane rotation of proof mass portion 104 and reject out-of-plane translation of proof mass portion 104. The beams of segment $L_1$ may be connected to the beams of segment $L_2$ using any suitable arrangement, including but not limited to 45°-angled beams 606 (as shown on FIG. 6A), curved beams, 90°-bends, or any combination thereof. While segments $L_1$ and $L_2$ are each illustrated as including two switchback portions, each segment may include any other suitable number of switchback portions greater than or equal to one.

The width (in the x-axis) of the individual beams of segment $L_1$ may be between 1 μm and 30 μm, between 1 μm and 20 μm, between 1 μm and 15 μm, between 1 μm and 10 μm, between 1 μm and 5 μm, between 2 μm and 5 μm, between 5 μm and 30 μm, between 5 μm and 20 μm, between 5 μm and 15 μm, between 5 μm and 10 μm, or between any other suitable range. The width (in the x-axis) of segment $L_1$ may be at least one and a half times the width of the individual beams, at least two times the width of the individual beams, at least three times the width of the individual beams, at least five times the width of the individual beams, or at least seven times the width of the individual beams, among other possible values. Similar sizes may be used for the width (in the y-axis) of the individual beams of segment $L_2$ and for the width (in the y-axis) of segment $L_2$.

Figure 7A:
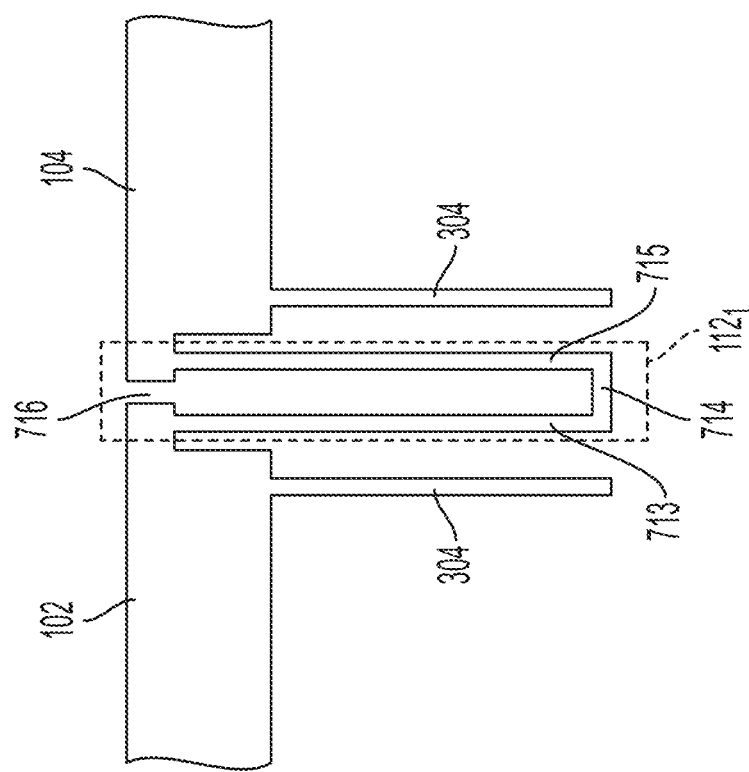
FIG. 7A is a schematic diagram illustrating a coupler of the MEMS accelerometer of FIG. 5 in additional detail, according to some non-limiting embodiments.
Figure 7B:
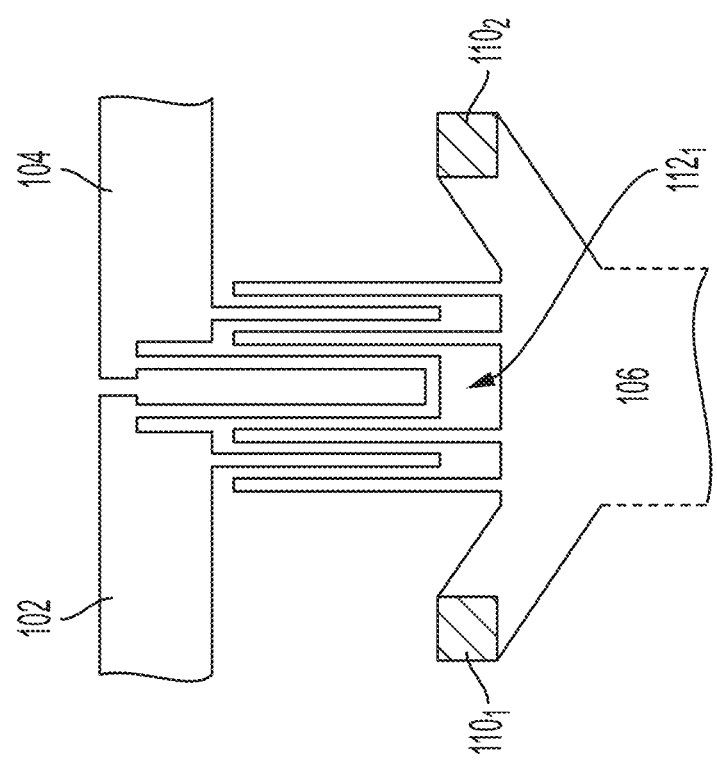
FIG. 7B is a schematic diagram illustrating the coupler of FIG. 7A in additional detail, according to some non-limiting embodiments.

FIG. 7A illustrates coupler $112_1$ of the MEMS accelerometer of FIG. 5 in additional detail, in accordance with some embodiments. FIG. 7A illustrates coupler $112_1$, proof mass portions 102 and 104, the fingers extending from proof mass portions 102 and 104, fixed portion 106, anchors $110_1$ and $110_2$, and the fingers extending from fixed portion 106. Additionally, FIG. 7B illustrates the coupler of FIG. 7A in additional detail, where fixed portion 106, anchors $110_1$ and $110_2$, and the fingers extending from fixed portion 106 have been removed for the sake of clarity. In the example of FIG. 7B, coupler $112_1$ includes a switchback portion including beams 713 and 715 oriented primarily along the y-axis, and connecting beam 714 oriented primarily along the x-axis. It should be appreciated that other types of switchback portions, including those described with reference to FIG. 6B, may be used for coupler $112_1$. One end of the switchback portion is connected to proof mass portion 102 and the other end of the switchback portion is connected to proof mass portion 104. As further shown in FIG. 7B, a cut-out region 716 may be formed between proof mass portions 102 and 104. The cut-out region 716 may enable motion of proof mass portions 102 and 104 in different directions, for example when subject to out-of-plane acceleration. In some embodiments, proof mass portions 102 and 104 may be connected to one another only by switchback portions. The beams of coupler $112_1$ may be sized to hold proof mass portions 102 and 104 rigidly together when translating along the x-axis and y-axis. For example, the beams of coupler $112_1$ may be sized to maintain a substantially constant separation between proof mass portions 102 and 104 as they translate in the xy-plane. In some embodiments, coupler $112_1$ may also serve as part of a capacitive sensor for sensing in-plane acceleration along the x-axis.

MEMS accelerometers of the types described herein may form part of various systems with applications in a variety of fields, such as in sports, military, virtual reality, gaming, healthcare, and industrial setting, among others. The various systems may form part of, or be used, in an Internet of Things network. Examples of such systems and applications are now described.

Figure 8:
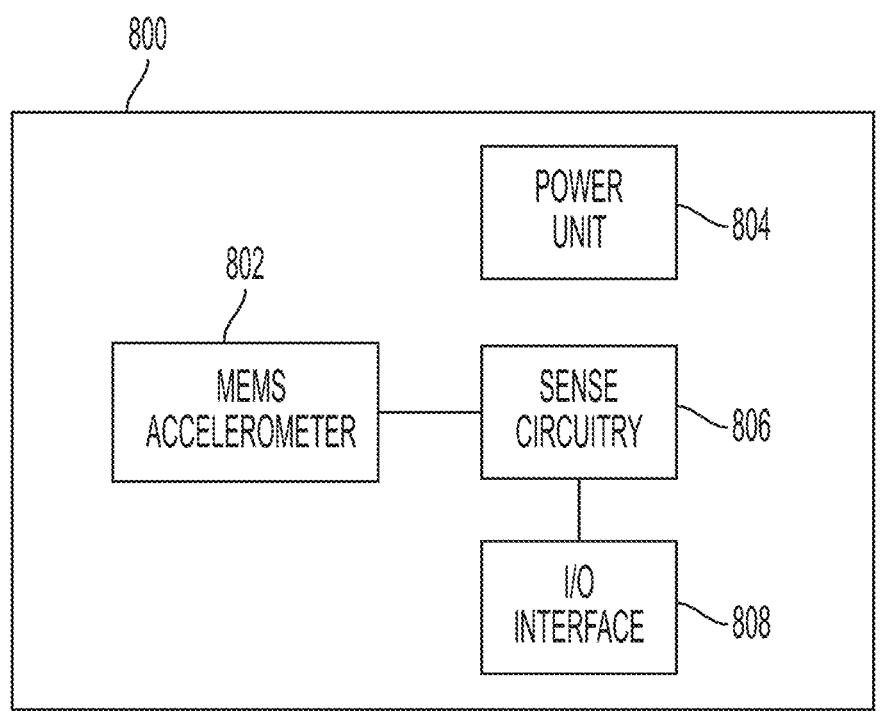
FIG. 8 is a block diagram illustrating an example of a system including a MEMS accelerometer, according to some non-limiting embodiments.

FIG. 8 is a block diagram illustrating a system 800, which may include a MEMS accelerometer 802, a power unit 804, sense circuitry 806 and input/output (I/O) interface 808. MEMS accelerometer 802 may be implemented as any one of the MEMS accelerometers described above. Optionally, MEMS accelerometer 802 may further include an angular accelerometer and/or a gyroscope. In some embodiments, sense circuitry 806 and MEMS accelerometer 802 may be disposed on the same substrate, such as a silicon substrate. In other embodiments, sense circuitry 806 and MEMS accelerometer 802 may be disposed on separate substrates, which may be bonded to one another and/or packaged within a common housing.

Sense circuitry 806 may be configured to sense acceleration, for example by mapping capacitance variations to magnitude of acceleration. Sense circuitry 806 may comprise an amplifier, an analog-to-digital converter, a memory, a processor, an application-specific integrated circuit (ASIC) or other analog and/or digital circuits.

System 800 may periodically transmit, via wired connections or wirelessly, signal that are indicative of sensed angular and/or linear acceleration to an external monitoring system, such as a computer, a smartphone, a tablet, a smartwatch, smartglasses, or any other suitable receiving device. I/O interface 808 may be configured to transmit and/or receive data via Wi-Fi, Bluetooth, Bluetooth Low Energy (BLE), Zigbee, Thread, ANT, ANT+, IEEE 802.15.4, IEEE 802.11.ah, or any other suitable wireless communication protocol. Alternatively, or additionally, I/O interface 808 may be configured to transmit and/or receive data using proprietary connectivity protocols. I/O interface 808 may comprise one or more antennas, such as a microstrip antenna. In some embodiments, I/O interface 808 may be connected to a cable, and may be configured to transmit and/or receive signals through the cable.

System 800 may be powered using power unit 804. Power unit 804 may be configured to power sense circuitry 806, I/O interface 808, and/or MEMS accelerometer 802. In some embodiments, power unit 804 may comprise one or more batteries. System 800 may, in at least some embodiments, consume sufficiently little power to allow for its operation for extended periods based solely on battery power. The battery or batteries may be rechargeable in some embodiments. Power unit 804 may comprise one or more lithium-ion batteries, lithium polymer (LiPo) batteries, super-capacitor-based batteries, alkaline batteries, aluminum-ion batteries, mercury batteries, dry-cell batteries, zinc-carbon batteries, nickel-cadmium batteries, graphene batteries or any other suitable type of battery. In some embodiments, power unit 804 may comprise circuitry to convert AC power to DC power. For example, power unit 804 may receive AC power from a power source external to system 800, such as via I/O interface 808, and may provide DC power to some or all the components of system 800. In such instances, power unit 804 may comprise a rectifier, a voltage regulator, a DC-DC converter, or any other suitable apparatus for power conversion.

Power unit 804 may comprise energy harvesting components and/or energy storage components, in some embodiments. Energy may be harvested from the surrounding environment and stored for powering the system 800 when needed, which may include periodic, random, or continuous powering. The type of energy harvesting components implemented may be selected based on the anticipated environment of the system 800, for example based on the expected magnitude and frequency of motion the system 800 is likely to experience, the amount of stress the system is likely to experience, the amount of light exposure the system is likely to experience, and/or the temperature(s) to which the system is likely to be exposed, among other possible considerations. Examples of suitable energy harvesting technologies include thermoelectric energy harvesting, magnetic vibrational harvesting, electrical overstress harvesting, photovoltaic harvesting, radio frequency harvesting, and kinetic energy harvesting. The energy storage components may comprise supercapacitors in some embodiments.

System 800 may be deployed in various settings to detect acceleration, including sports, healthcare, military, virtual reality, gaming, and industrial applications, among others. A system 800 may be part of a wearable device in some embodiments. For example, system 800 may be mounted as part of an earbud 900 (as shown in FIG. 9A), as part of a smartwatch 902 (as shown in FIG. 9B), or as part of a smartphone 904 (as shown in FIG. 9C). Other environments in which a system 800 may be deployed include tablets, laptops, smartglasses, medical devices, sports equipment, vehicles, among many others.

When mounted on a earbud 900, system 800 may be used to monitor motion of a user's head, for example for virtual reality or gaming applications. Additionally, or alternatively, system 800 may be used to enable voice recognition. For example, system 800 may detect vibrations generated by the voice of a user, and may use machine leaning technique to recognize speech. Additionally, or alternatively, system 800 may be used for noise cancellation. When mounted on a smartwatch 902, system 800 may detect motion of a user's arm, for example for sleep tracking, heart monitoring, step counting, among others. Similarly, when mounted on a smartphone 904, system 800 may detect motion of a specific part of a user's body.

Aspects of the technology described herein may provide one or more benefits, some of which have been previously described. Now described are some examples of such benefits. It should be appreciated that not all aspects and embodiments necessarily provide all of the benefits now described. Further, it should be appreciated that aspects of the technology described herein may provide additional benefits to those now described.

Aspects of the technology described herein provide a MEMS accelerometer having proof mass portions coupled together to form a single proof mass accelerometer. The entirety of the proof mass may contribute to detection of out-of-plane as well as in-plane acceleration. Thus, MEMS accelerometers of the types described herein are significantly more compact than other types of MEMS accelerometers.

Aspects of the technology described herein provide a MEMS accelerometer configured to detect out-of-plane and in-plane acceleration in a differential fashion. Thus, MEMS accelerometers of the types described herein are significantly more sensitive to acceleration than other types of MEMS accelerometers. As a result, some MEMS accelerometers of the types described herein are suitable for use in low-noise applications.

The terms "approximately", "substantially," and "about" may be used to mean within ±20% of a target value in some embodiments, within ±10% of a target value in some embodiments, within ±5% of a target value in some embodiments, and within ±2% of a target value in some embodiments. The terms "approximately," "substantially," and "about" may include the target value.

What is claimed is:

1. A microelectromechanical system (MEMS) accelerometer comprising:
   a proof mass comprising first and second portions defining a plane and connected to each other by a coupler, wherein:
      in response to out-of-plane acceleration, the first portion of the proof mass is configured to rotate clockwise relative to an axis and the second portion of the proof mass is configured to rotate counterclockwise relative to the axis,
      in response to in-plane acceleration in a first direction, the first and second portions are both configured to translate in the first direction, and
      in response to in-plane acceleration in a second direction different from the first direction, the first and second portions are both configured to translate in the second direction;
   a first sensor configured to sense in-plane translation of the proof mass in the first direction; and
   a second sensor configured to sense in-plane translation of the proof mass in the second direction.

2. The MEMS accelerometer of claim 1, wherein the first portion of the proof mass is connected to a substrate by a first anchor and the second portion of the proof mass is connected to the substrate by a second anchor.

3. The MEMS accelerometer of claim 2, wherein the first portion of the proof mass is connected to the first anchor by a tether that is:
   compliant with respect to translation of the first portion of the proof mass in the first direction,
   compliant with respect to translation of the first portion of the proof mass in the second direction,
   compliant with respect to out-of-plane rotation of the first portion of the proof mass, and
   stiff with respect to out-of-plane translation of the first portion of the proof mass.

4. The MEMS accelerometer of claim 3, wherein the tether is L-shaped and comprises a plurality of switchback portions.

5. The MEMS accelerometer of claim 2, wherein the first portion of the proof mass is connected to the first anchor by a tether comprising a first switchback portion and a second switchback portion, the first and second switchback portions being oriented substantially perpendicularly relative to each other.

6. The MEMS accelerometer of claim 2, wherein, in response to the out-of-plane acceleration, the first portion of the proof mass is configured to rotate about a rotation axis that is offset in the plane relative to the first anchor.

7. The MEMS accelerometer of claim 1, wherein the coupler is configured to prevent simultaneous clockwise rotational motion of the first and second portions of the proof mass.

8. The MEMS accelerometer of claim 1, wherein the coupler comprises:
   a switchback portion;
   a first end fixed to the first portion of the proof mass; and
   a second end fixed to the second portion of the proof mass.

9. The MEMS accelerometer of claim 1, further comprising a third sensor configured to sense out-of-plane motion of the proof mass.

10. The MEMS accelerometer of claim 1, wherein the first sensor comprises a first finger configured to form a first sense capacitor with the first portion of the proof mass and the second sensor comprises a second finger configured to form a second sense capacitor with the second portion of the proof mass.

11. A method for sensing acceleration using a microelectromechanical system (MEMS) accelerometer having a proof mass comprising first and second proof mass portions defining a plane, the method comprising:
   sensing in-plane translation of the proof mass in a first direction parallel to the plane;
   sensing in-plane translation of the proof mass in a second direction parallel to the plane and different from the first direction; and
   sensing out-of-plane acceleration of the MEMS accelerometer by:
      sensing clockwise rotational motion of the first proof mass portion; and
      sensing counterclockwise rotational motion of the second proof mass portion,
      wherein the clockwise rotational motion of the first proof mass portion and the counterclockwise rotational motion of the second proof mass portion are defined relative to a common axis.

12. The method of claim 11, wherein sensing out-of-plane acceleration of the MEMS accelerometer comprises:
   sensing clockwise rotational motion of the first proof mass portion and sensing counterclockwise rotational motion of the second proof mass portion simultaneously.

13. The method of claim 11, wherein sensing clockwise rotational motion of the first proof mass portion comprises sensing a variation in a separation between the first proof mass portion and a substrate to which the first proof mass portion is connected.

14. The method of claim 11, wherein sensing in-plane translation of the proof mass in the first direction comprises sensing translation of both the first and second proof mass portions in the first direction.

15. The method of claim 11, wherein sensing out-of-plane acceleration of the MEMS accelerometer further comprises:
sensing counterclockwise rotational motion of the first proof mass portion; and
sensing clockwise rotational motion of the second proof mass portion,
wherein the counterclockwise rotational motion of the first proof mass portion and the clockwise rotational motion of the second proof mass portion are defined relative to the common axis.

16. A microelectromechanical system (MEMS) accelerometer comprising:
a proof mass comprising first and second portions defining a plane and connected to each other by a coupler, the first and second portions being configured to:
in response to in-plane acceleration along a first direction, experience a first common translational mode in the first direction;
in response to in-plane acceleration along a second direction different from the first direction, experience a second common translational mode in the second direction; and
in response to out-of-plane acceleration, experience a butterfly mode; and
a sensor configured to sense in-plane translation of the proof mass.

17. The MEMS accelerometer of claim 16, wherein the first portion of the proof mass is connected to a substrate by an anchor, and wherein the first portion of the proof mass is connected to the anchor by a tether comprising a first switchback portion and a second switchback portion, the first and second switchback portions being oriented substantially perpendicularly relative to each other.

18. The MEMS accelerometer of claim 16, wherein the first portion of the proof mass is connected to a substrate by an anchor, and wherein, in response to out-of-plane acceleration, the first portion of the proof mass is configured to rotate about a rotation axis that is offset in the plane relative to the anchor.

19. The MEMS accelerometer of claim 16, wherein the coupler is configured to prevent simultaneous clockwise rotational motion of the first and second proof mass portions.

20. The MEMS accelerometer of claim 16, wherein the coupler comprises:
a switchback portion;
a first end fixed to the first portion of the proof mass; and
a second end fixed to the second portion of the proof mass.

* * * * *